C. G. CRISPIN.
SLIP OR EXTENSION JOINT.
APPLICATION FILED FEB. 5, 1915.

1,182,146.

Patented May 9, 1916.
2 SHEETS—SHEET 1.

Witnesses:
Frank H. Borden
A. A. Hammond

Inventor:
Clarence G. Crispin
by Louis Bagger
his Attys.

C. G. CRISPIN.
SLIP OR EXTENSION JOINT.
APPLICATION FILED FEB. 5, 1915.

1,182,146.

Patented May 9, 1916.
2 SHEETS—SHEET 2.

Witnesses:
Frank H. Bowen
A. A. Hammond

Inventor:
Clarence G. Crispin
By Louis Bagger & Co
his Attys.

UNITED STATES PATENT OFFICE.

CLARENCE GEARHART CRISPIN, OF SALEM TOWNSHIP, LUZERNE COUNTY, PENNSYLVANIA.

SLIP OR EXTENSION JOINT.

1,182,146.   Specification of Letters Patent.   Patented May 9, 1916.

Application filed February 5, 1915. Serial No. 6,243.

*To all whom it may concern:*

Be it known that I, CLARENCE G. CRISPIN, a citizen of the United States, residing at Salem township, in the county of Luzerne and State of Pennsylvania, have invented certain new and useful Improvements in Slip or Extension Joints, of which the following is a specification.

This invention relates to an improvement in slip or extension-joints for use in water, steam or gas lines, and the object is to provide means whereby a connection can be readily made, and the two sections of the joint telescoped readily when necessary.

The invention consists of certain novel features of construction and combinations of parts which will be hereinafter fully described and pointed out in the claims.

Figure 1:
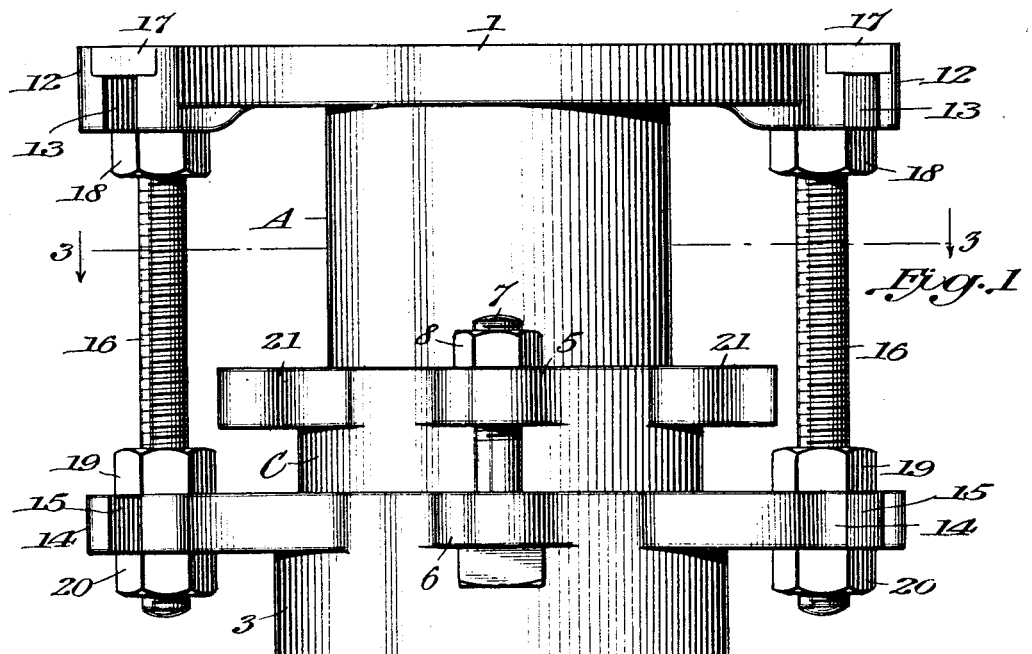
Figure 2:
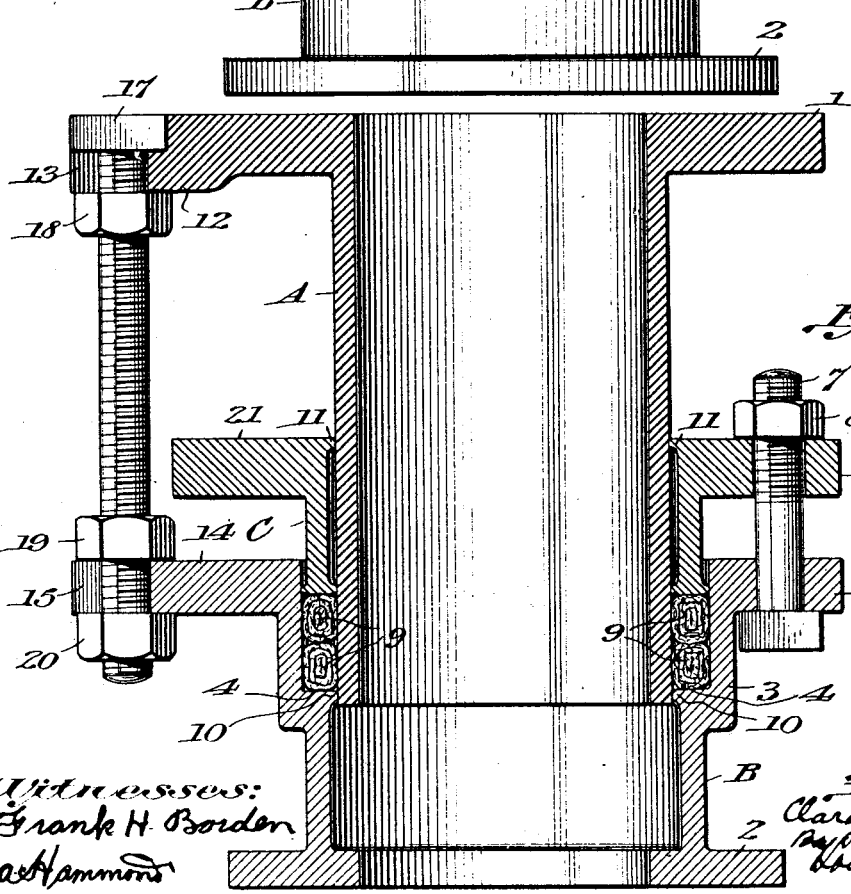
Figure 3:
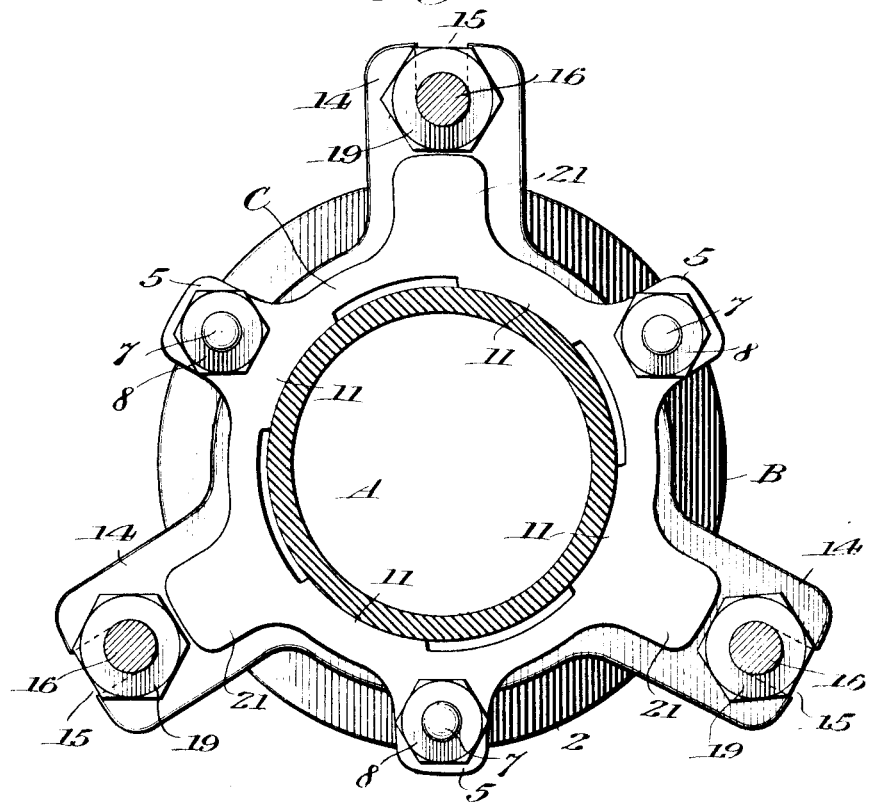
Figure 4:
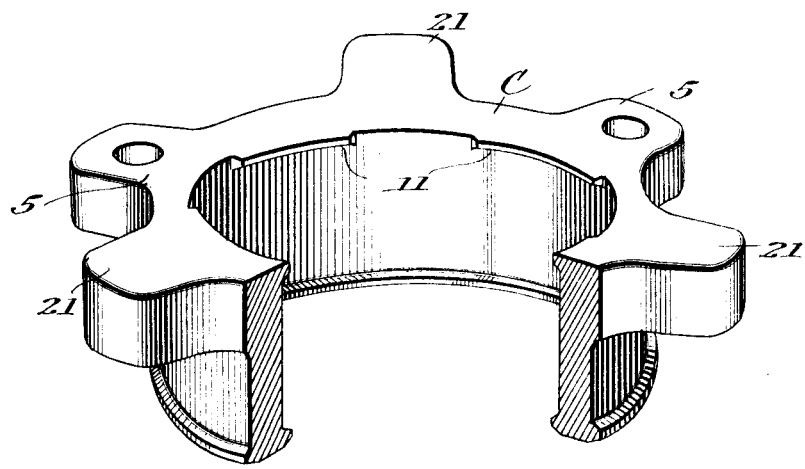

In the accompanying drawings:—Figure 1 is a view in side elevation; Fig. 2 is a vertical sectional view; Fig. 3, is a plan view taken on the line 3—3 of Fig. 1; and Fig. 4 is a perspective view of the gland partly broken away.

This joint is intended to be placed in a water or other line, adjacent to any fixture that is necessary to remove from time to time. Thus, for instance, when a large water-meter, valve or other fixture is placed in a pipe line, one of these slip-joints is bolted fast to the fixture and placed in the line with it.

A, represents the spigot end or section, and B, represents the bell end or section. Each section is provided with an annular flange 1 and 2 respectively, for making the desired connections in the line. Section A is mounted within section B and is capable of sliding therein, so that a telescopic joint is produced. The section B is so cast as to form a bell, as at 3, and against the shoulder 4 of the bell a packing is received, which is interposed between the bell 3 and the section A. A gland C is mounted upon the section A and is provided with projections 5. Similar projections 6 are formed upon the bell 3, and bolts 7 pass through the projections 5 and 6 of the gland and bell-section for drawing the gland into the bell. A nut 8 is screwed on each of the bolts 7, and by turning this nut, the gland is forced into the bell for compressing the packing 9 for making a liquid and air-tight joint. An annular bead 10 is formed on the bell section B adjacent to the shoulder 4 of the bell which engages the section A and forms the bearing surface.

The gland C is provided with a plurality of segments or lips 11, which are adapted to engage the outer surface of the section A. These segments or lips 11 and the bead 10 form the entire bearing surface, which engages the section A of the gland and bell section. The object of this is to overcome rusting and corrosion. By providing a minimum bearing surface, there is less liability of corrosion, and what corrosion takes place will not affect the joint to any appreciable degree to affect the ready expansion and contraction of the members with respect to to each other.

The flange 1 of section A is provided with a plurality of lugs 12, which are provided with slots 13. Similar lugs 14 are formed upon the bell 3 of the bell-section B, and these lugs 14 are also provided with slots 15. Bolts 16 are received in the slots 13 and 15 of the lugs 12 and 14, and the heads of the bolts are seated in a recess 17 formed in the lugs 12, so that the outer surface of the bolts are flush with the face or surface of the flange 1 and will not interfere with any connection which may be made with this section.

A nut 18 is applied to each bolt 16 for fastening the head in place, the nuts being screwed down against the lugs 12 for maintaining the heads of the bolts in position. Nuts 19 are applied to the bolts 16 and are intended to engage the inner face of the lugs 14, while the nuts 20 are screwed upon the bolts 16 and engage the other or outer face of the lugs 14. In this way, the two sections are held the required distance apart, and are drawn toward and move from, each other. When it is desired to draw the two sections together, the nuts 19 are released from engagement with the lugs 14, and are moved along the bolts 16 so that by the turning of the nuts 20 against the lugs 14, the two sections will be caused to be moved toward each other; or, if one section is in a rigid position, the other section will be drawn toward it. If, however, it is desired to separate the two sections, so that the flanges 1 and 2 will be farther apart, the operation is reversed. In this instance, the nuts 20 are released, and the nuts 19 are used for causing the separation of the sections. If the gland C should become slightly corroded and stick by the segments 11 rusting to the bell 3 and section A, a chisel or other tool can be driven between the lugs 14 and lugs 21 on the gland for forcing the gland upward and along the section A, after the nuts have been released from engagement with the gland.

It may be found necessary, in many instances, to only retain the bolts 16 in position during the shipping of the joint, and in laying it in the pipe line in a perfectly straight line perpendicular with the axis of the joint, because after the joint is once in the pipe line, the long bolts 16 may be removed, as they are not needed until the joint is to be opened, when they can be readily applied so that the spigot end A can be drawn away from the fixture.

I claim:

1. In an extensible or slip joint, the combination of two sections, one section being received within the other, means connecting the two sections together for moving the sections from and toward each other, a bell formed upon one section and a bead formed on the inner periphery of the bell section for forming a contact point with a minimum bearing surface upon the other section, packing received in the bell section, and a gland adapted to press upon said packing, said gland being provided on its inner and outer periphery with beads for forming a minimum contact with said sections, the whole so arranged that a minimum bearing surface is provided between all of the parts.

2. In an extensible or slip joint, the combination with two sections, lugs on said sections, means between said lugs for moving the sections from and toward each other, one of said sections having a bell formed thereon and adapted to receive the other section, packing received in the bell, a gland adapted to be forced against said packing, means for forcing said gland against said packing, lugs on said gland placed in a position above said lugs on the bell section, whereby upon the insertion of a crow-bar therebetween, said lugs coöperate to loosen said gland from said outer section.

3. In an extensible or slip joint, the combination with inner and outer sections, of a gland, a bell formed on the outer section and beads formed on the inner periphery of said outer section, the inner section being slidably mounted upon said beads, said gland being provided on its inner periphery with beads in contact with said inner section, whereby a minimum bearing surface is secured, the outer periphery of said gland being provided with beads to form a minimum bearing surface against the bell of said outer section, lugs on said outer section, and lugs formed on said gland in such relation to each other that, in the event of corrosion of parts, a crow bar can be inserted between the lugs on said bell formed section and on said gland, whereby said gland may be loosened, means connected between said gland and said outer section whereby the gland may be forced down against the packing, lugs on said inner section, and bolts removably mounted between the lugs on said inner and outer sections, whereby the sections may be drawn to or away from each other.

4. In an extensible joint, the combination with two sections, one of said sections received within the other, a bead formed on the said other section and in engagement with the first-mentioned section for forming the bearing surface between the two sections, a bell formed on the bead section, a packing received in the bell, a gland provided with lips on the surface thereof adapted to engage the members, and means for drawing the gland into the bell for compressing the packing and forming a tight joint, said bead and lips forming the bearing surface between the sections and gland for forming a minimum corroding surface between the sections.

In testimony whereof I affix my signature, in the presence of two witnesses.

CLARENCE GEARHART CRISPIN.

Witnesses:
F. M. WALTON,
J. F. CASEY.